(12) United States Patent
Li

(10) Patent No.: US 10,810,698 B2
(45) Date of Patent: Oct. 20, 2020

(54) INFORMATION PROCESSING METHOD AND CLIENT

(71) Applicant: TENCENT TECHNOLOGY (SHENZHEN) COMPANY LIMITED, Shenzhen, Guangdong (CN)

(72) Inventor: Guang Li, Guangdong (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 184 days.

(21) Appl. No.: 15/984,897

(22) Filed: May 21, 2018

(65) Prior Publication Data

US 2018/0268515 A1 Sep. 20, 2018

Related U.S. Application Data

(63) Continuation of application No. PCT/CN2017/073614, filed on Feb. 15, 2017.

(30) Foreign Application Priority Data

Feb. 19, 2016 (CN) .......................... 2016 1 0095182

(51) Int. Cl.
*G06T 3/00* (2006.01)
*G06F 16/583* (2019.01)
(Continued)

(52) U.S. Cl.
CPC ........ *G06T 3/0006* (2013.01); *G06F 3/04842* (2013.01); *G06F 16/5838* (2019.01);
(Continued)

(58) Field of Classification Search
CPC .......... G06T 3/0006; G06T 3/40; G06T 3/60; G06T 11/60; G06F 16/5838; G06F 3/04842; G06K 9/46
See application file for complete search history.

(56) References Cited

U.S. PATENT DOCUMENTS

2011/0238768 A1* 9/2011 Habets ................ G06F 11/0748
709/206

FOREIGN PATENT DOCUMENTS

CN 103198424 A 7/2013
CN 103647978 A 3/2014
(Continued)

OTHER PUBLICATIONS

International Search Report for PCT/CN2017/073614 dated Apr. 27, 2017 [PCT/ISA/210].
(Continued)

*Primary Examiner* — Leon Flores
(74) *Attorney, Agent, or Firm* — Sughrue Mion, PLLC

(57) ABSTRACT

A method and a client are provided. The method includes determining a first parameter according to a detected first operation, the first parameter being used for indicating a cut-out area. A first image corresponding to the cut-out area is obtained according to the first parameter. Recognition is performed on the first image, and based on a recognition result, recommendation information associated with the first image is obtained. A second operation of selecting target information from the recommendation information is detected, and the selected target information is added to the first image to generate a second image.

18 Claims, 11 Drawing Sheets

501 — Determine a first parameter according to a detected first operation, where the first parameter is used for indicating a cut-out area; and obtain, according to the first parameter, a first image corresponding to the cut-out area 502 — Perform recognition on the first image, and obtain, through resolution based on a recognition result, recommendation information associated with the first image 503 — Present a first toolbar and a second toolbar, where the first toolbar includes at least one interaction object; present, in the second toolbar when a first interaction object in the first toolbar is selected, recommendation information corresponding to the selected first interaction object; and present, in the second toolbar when a second interaction object in the first toolbar is selected, recommendation information corresponding to the selected second interaction object 504 — Obtain a second operation of selecting target information from the recommendation information; and add the target information to the first image to generate a second image

(51) Int. Cl.
    *G06T 11/60*     (2006.01)
    *G06T 7/10*     (2017.01)
    *G06F 3/0484*     (2013.01)
    *G06K 9/46*     (2006.01)
    *G06T 3/40*     (2006.01)
    *G06T 3/60*     (2006.01)

(52) U.S. Cl.
    CPC ................. *G06K 9/46* (2013.01); *G06T 3/40* (2013.01); *G06T 3/60* (2013.01); *G06T 7/10* (2017.01); *G06T 11/60* (2013.01)

(56) References Cited

FOREIGN PATENT DOCUMENTS

| | | |
|---|---|---|
| CN | 103823858 A | 5/2014 |
| CN | 104462135 A | 3/2015 |
| JP | 2007-098794 A | 4/2007 |

OTHER PUBLICATIONS

Written Opinion dated Apr. 27, 2017 issued by the International Bureau in PCT/CN2017/073614.
Communication dated Apr. 3, 2019 issued by the State Intellectual Property Office of People's Republic of China in counterpart application No. 201610095182.4.

\* cited by examiner

INFORMATION PROCESSING METHOD AND CLIENT

CROSS-REFERENCE TO RELATED APPLICATIONS

This application is a continuation of International Application No. PCT/CN2017/073614 filed Feb. 15, 2017, claiming priority based on Chinese Patent Application No. 201610095182.4, filed with the Chinese Patent Office on Feb. 19, 2016, the contents of both of which are incorporated by reference in its entirety.

FIELD

The present disclosure relates to information processing technologies, and in particular, to an information processing method and a client.

BACKGROUND

Screen capture functions are widely used by users. Related art screen capture methods mainly include the following types. In a first method, screen capture is performed by using a particular key or a combination of particular keys on a terminal. By this first method, a picture of an entire screen or a picture of a current window is obtained. In a second method, an application (APP) having a screen capture function is opened, and screen capture is performed by using a shortcut key of the application. By this second method, a screenshot of any area on the screen may be taken. In a third method, screen capture is performed by using a specialized screen capture tool.

In most of the related art screen capture methods, it is not possible to edit screenshot content after the screen capture is formed. Some related art screen capture tools implement simple screenshot editing functions, but the related art screen capture tools can provide only limited editing content for users. Moreover, the provided editing content often has no association with the screenshot content. Consequently, recommended content is not accurately associated.

SUMMARY

It is an aspect to provide an information processing method and a client that addresses the disadvantages of the related art screen capture methods and tools.

According to an aspect of one or more exemplary embodiments, there is provided a method. The method includes determining a first parameter according to a detected first operation, the first parameter being used for indicating a cut-out area. A first image corresponding to the cut-out area is obtained according to the first parameter. Recognition is performed on the first image, and based on a recognition result, recommendation information associated with the first image is obtained. A second operation of selecting target information from the recommendation information is detected, and the selected target information is added to the first image to generate a second image.

According to other aspects of one or more exemplary embodiments, there is also provided additional methods and a client consistent with the method.

BRIEF DESCRIPTION OF THE DRAWINGS

Various exemplary embodiments will now be described with reference to the accompanying drawings, in which.

DETAILED DESCRIPTION

To make the features and technical content of the exemplary embodiments more compressible, the following describes implementations of the exemplary embodiments in detail with reference to the accompanying drawings. The accompanying drawings are intended only for reference, and not intended to limit the exemplary embodiments. The accompanying drawings are not to scale unless specifically indicated.

In the technical solutions provided in the example embodiments, the first parameter is determined according to the detected first operation, and the first parameter is used for indicating the cut-out area. The first image corresponding to the cut-out area is obtained according to the first parameter. Recognition is performed on the first image, and the recommendation information associated with the first image is obtained through resolution based on the recognition result. The second operation of selecting the target information from the recommendation information is performed. The target information is added to the first image to generate the second image. It may be learned that, by means of the technical solutions in the example embodiments, a screen capture function is implemented, and a screenshot editing function is also implemented. In addition, information associated with screenshot content is recommended to a user, so that accurately associated editing content is recommended.

Figure 1:
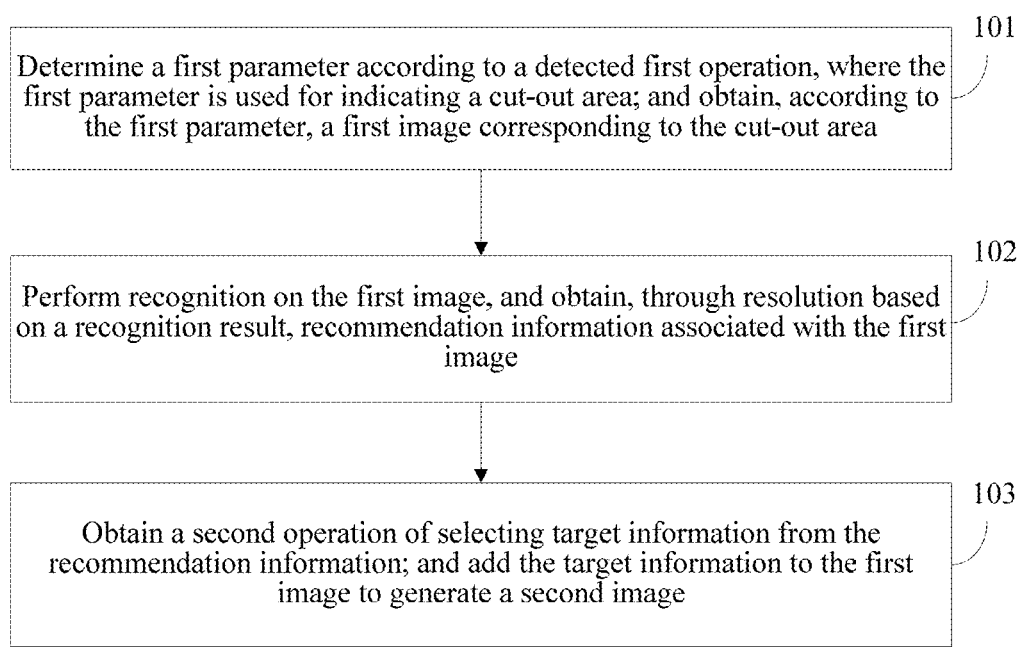
FIG. 1 is a schematic flowchart of an information processing method according to an exemplary embodiment.

FIG. 1 is a schematic flowchart of an information processing method according to an exemplary embodiment. The information processing method in this exemplary embodiment is applied to a client. As shown in FIG. 1, the information processing method includes the following steps:

Step 101. Determine a first parameter according to a detected first operation, where the first parameter is used for indicating a cut-out area; and obtain, according to the first parameter, a first image corresponding to the cut-out area.

In this exemplary embodiment, the client may be used across platforms and supports an Android operating system, an iPhone operating system (iOS), a Windows operating system, or the like.

The client has installed therein a first application. For example, the first application may be a news application or a video application. After the first application is enabled, target media information may be presented. Using an example in which the first application is a video application, the first application plays a target video, to present a video picture to a user. The presented video picture is not editable.

In some exemplary embodiments, the first application has a screen capture function. When the client receives an instruction for instructing to perform screen capture, the client starts to detect whether the first operation is performed on the target media information. Herein, the first operation may be specifically a screen capture operation. In this case, the user may perform a screen capture operation on an area, in which is the user interested, on the target media information. In some exemplary embodiments, a click of a mouse may be performed to locate a cursor at a first position, and then the mouse is moved to locate the cursor at a second position, and the process ends. A rectangular area that is formed by using a line between the first position and the second position as a diagonal line is the cut-out area. On such a basis, the client determines the first parameter according to the detected first operation, and the first parameter may be coordinates of the first position and coordinates of the second position. A unique cut-out area may be determined by using coordinates of two positions. Thus, the first parameter indicates the cut-out area. Alternatively, the entire target media information may be cut out. In some exemplary embodiments, cutting out of the entire target media information may be triggered by clicking a particular key (for example, a home key).

Using an example in which the target media information is an image, an image displayed on a screen is formed by pixels, and each pixel corresponds to coordinates of one position. All pixels in the cut-out area determined by the first parameter are extracted, to generate a picture, that is, to generate the first image corresponding to the cut-out area. As described above, the cut-out area may be a portion of the entire image displayed on the screen, or may be the entire image displayed on the screen. The generated picture supports a Graphics Interchange Format (GIF), a Joint Photographic Experts Group (JPEG) format, a bitmap (BMP) format, or the like.

Step 102. Perform recognition on the first image, and obtain, through resolution based on a recognition result, recommendation information associated with the first image.

In this exemplary embodiment, the performing recognition on the first image may be specifically: resolving the first image to obtain a key word related to the first image, and obtaining the recommendation information corresponding to the key word. In this way, the recommendation information may be dynamically generated according to content of the first image that is cut out. For example, if it is obtained through resolution (i.e., resolving of the first image) that the content of the first image is related to a key word "fruit", a fruit-related picture is used as the recommendation information.

Step 103. Obtain a second operation of selecting target information from the recommendation information; and add the target information to the first image to generate a second image.

Figure 8:
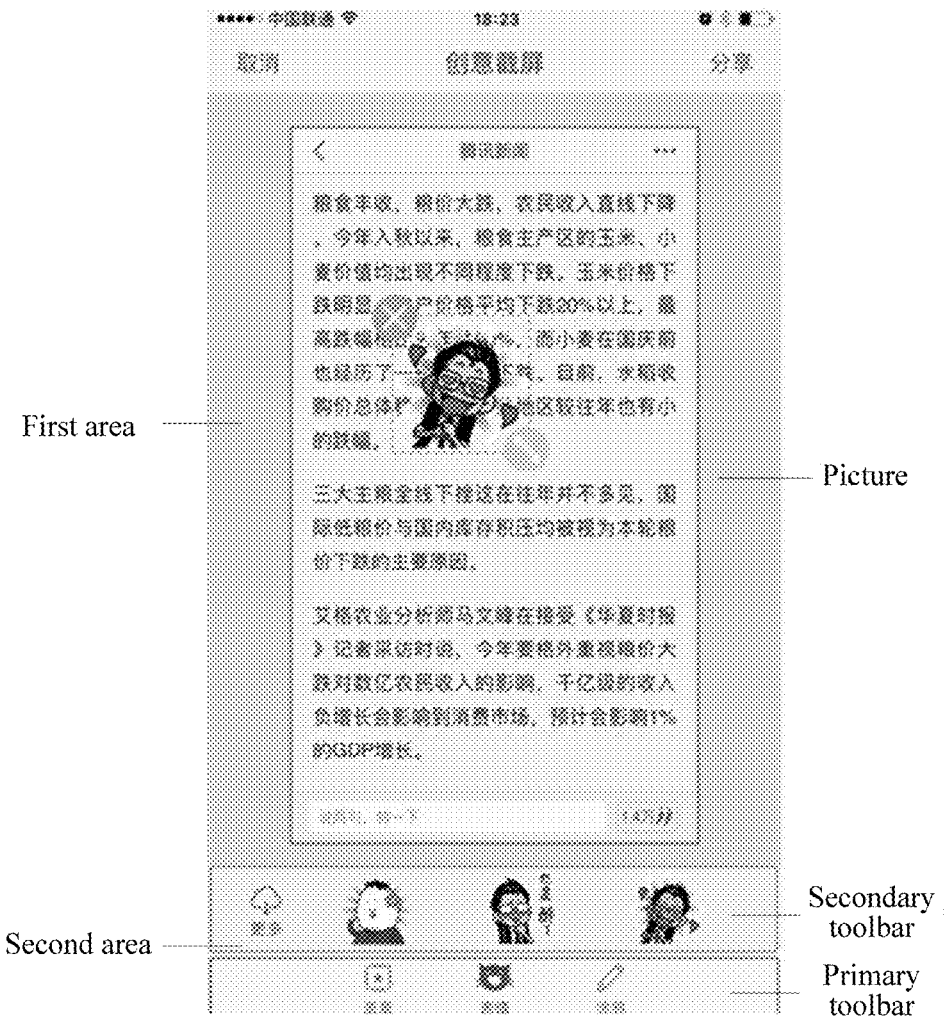
FIG. 8 is a schematic diagram 1 of a screenshot interface scenario according to an exemplary embodiment.

In this exemplary embodiment, after the screen capture is performed, the client then detects whether the second operation is performed on the first image that is cut out. Herein, the second operation may be specifically an editing operation. In this exemplary embodiment, the client provides abundant editing functions in a toolbar for the user, and each editing function is embodied by using an interaction object. At least three types of editing functions are provided in the toolbar for the user. For a first type of editing function, a first type of picture information may be edited on the picture. In a second type of editing function, a second type of picture information may be edited on the picture. In a third type of editing function, text information and/or drawing information may be edited on the picture. Referring to FIG. 8, for example, a stamping function, an emotion function, and a graffiti function may be provided in the toolbar. The stamping function corresponds to the first type of picture information in this exemplary embodiment, the emotion function corresponds to the second type of picture information in this exemplary embodiment, and the graffiti function corresponds to the text information or the drawing information in this exemplary embodiment. The user may select, from the toolbar, the target information (the selecting the target information may correspond to the second operation), for example, an emotion, and then add the emotion to the picture.

In this exemplary embodiment, the target information added to the first image that is cut out may be any combination of the first type of picture information, the second type of picture information, and the third type of picture information. Thus, in the technical solution in this exemplary embodiment, a screen capture function is implemented for a non-editing application, and abundant editing is available for the first image that is cut out. Not only the first type of picture information such as a stamp but also the second type of picture information such as the emotion, and the third type of picture information such as the text information, and the drawing information may be edited for the media information. In addition, in the technical solution in this exemplary embodiment, the screen capture function is implemented, and information associated with screenshot content is recommended to a user, so that accurately associated editing content is recommended.

Figure 2:
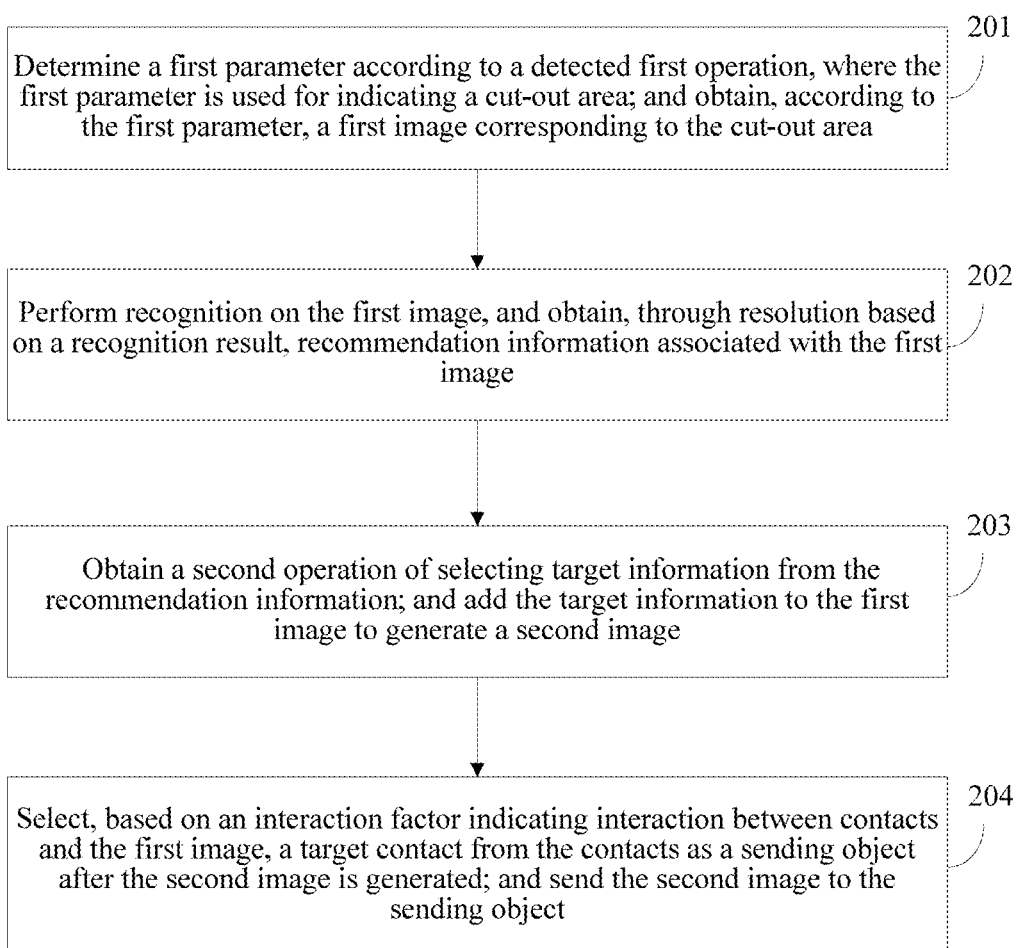
FIG. 2 is a schematic flowchart of an information processing method according to an exemplary embodiment.

FIG. 2 is a schematic flowchart of an information processing method according to an exemplary embodiment. The information processing method in this exemplary embodiment may be applied to a client. As shown in FIG. 2, the information processing method includes the following steps:

Step 201. Determine a first parameter according to a detected first operation, where the first parameter is used for indicating a cut-out area; and obtain, according to the first parameter, a first image corresponding to the cut-out area.

In this exemplary embodiment, the client may be used across platforms and supports an Android operating system, an iOS, a Windows operating system, or the like.

The client has installed a first application. For example, the first application may be a news application or a video application. After the first application is enabled, target media information may be presented. Using an example in which the first application is a video application, the first application plays a target video, to present a video picture to a user. The presented video picture is not editable.

In some exemplary embodiments, the first application has a screen capture function. When the client receives an instruction for instructing to perform screen capture, the client starts to detect whether the first operation is performed on the target media information. Herein, the first operation may be specifically a screen capture operation. In this case, the user may perform a screen capture operation on an area, in which is the user interested, on the target media information. In some exemplary embodiments, a click of a mouse may be performed to locate a cursor at a first position; and then the mouse is moved to locate the cursor at a second position, and the process ends. A rectangular area that is formed by using a line between the first position and the second position as a diagonal line is the cut-out area. On such a basis, the client determines the first parameter according to the detected first operation, and the first parameter may be coordinates of the first position and coordinates of the second position. A unique cut-out area may be determined by using coordinates of two positions. Thus, the first parameter indicates the cut-out area. Alternatively, the entire target media information may be cut out. In some exemplary embodiments, cutting out of the entire target media information may be triggered by clicking a particular key (for example, a home key).

Using an example in which the target media information is an image, an image displayed on a screen is formed by pixels, and each pixel corresponds to coordinates of one position. All pixels in the cut-out area determined by the first parameter are extracted, to generate a picture, that is, to generate the first image corresponding to the cut-out area. As described above, the cut-out area may be a portion of the entire image displayed on the screen, or may be the entire image displayed on the screen. The generated picture supports a GIF, a JPEG format, a BMP format, or the like.

Step 202. Perform recognition on the first image, and obtain, through resolution based on a recognition result, recommendation information associated with the first image.

In this exemplary embodiment, the performing recognition on the first image may be specifically: resolving the first image to obtain a key word related to the first image; and obtaining the recommendation information corresponding to the key word. In this way, the recommendation information may be dynamically generated according to content of the first image that is cut out. For example, if it is obtained through resolution (i.e., resolving of the first image) that the content of the first image is related to a key word "fruit", a fruit-related picture is used as the recommendation information.

Step 203. Obtain a second operation of selecting target information from the recommendation information; and add the target information to the first image to generate a second image.

In this exemplary embodiment, after the screen capture is performed, the client then detects whether the second operation is performed on the first image that is cut out. Herein, the second operation may be specifically an editing operation. In this exemplary embodiment, the client provides abundant editing functions in a toolbar for the user, and each editing function is embodied by using an interaction object. At least three types of editing functions are provided in the toolbar for the user. For a first type of editing function, a first type of picture information may be edited on the picture. In a second type of editing function, a second type of picture information may be edited on the picture. In a third type of editing function, text information and/or drawing information may be edited on the picture. Referring to FIG. 8, a stamping function, an emotion function, and a graffiti function are provided in the toolbar. The stamping function corresponds to the first type of picture information in this exemplary embodiment, the emotion function corresponds to the second type of picture information in this exemplary embodiment, and the graffiti function corresponds to the text information or the drawing information in this exemplary embodiment. The user may select, from the toolbar, the target information (the selecting the target information may correspond to the second operation), for example, an emotion, and then add the emotion to the picture.

In this exemplary embodiment, the target information added to the first image that is cut out may be any combination of the first type of picture information, the second type of picture information, and the third type of picture information. Thus, in the technical solution in this exemplary embodiment, a screen capture function is implemented for a non-editing application, and abundant editing is available for the first image that is cut out. Not only the first type of picture information such as a stamp but also the second type of picture information such as the emotion, and the third type of picture information such as the text information, and the drawing information may be edited for the media information. In addition, in the technical solution in this exemplary embodiment, the screen capture function is provided, and information associated with screenshot content is recommended to a user, so that accurately associated editing content is recommended.

Step 204. Select, based on an interaction factor indicating interaction between contacts and the first image, a target contact from the contacts as a sending object after the second image is generated; and send the second image to the sending object.

In this exemplary embodiment, the interaction factor indicates how much a contact is interested in the first image. The interaction factor may be obtained by using social networking data, for example, the number of times of browsing the first image by a contact, an attention degree, or whether the user makes a comment or performs forwarding or liking.

In this exemplary embodiment, the client automatically pops up a share option after the first image that is cut out is edited, and a contact provided in the share option is the target contact that is recommended in this exemplary embodiment based on the interaction factor. The user may select a target object that the user expects to share with, for example, a friend circle, a friend, or a microblog, and send the second image after editing the selected target object, to implement information sharing.

Figure 3:
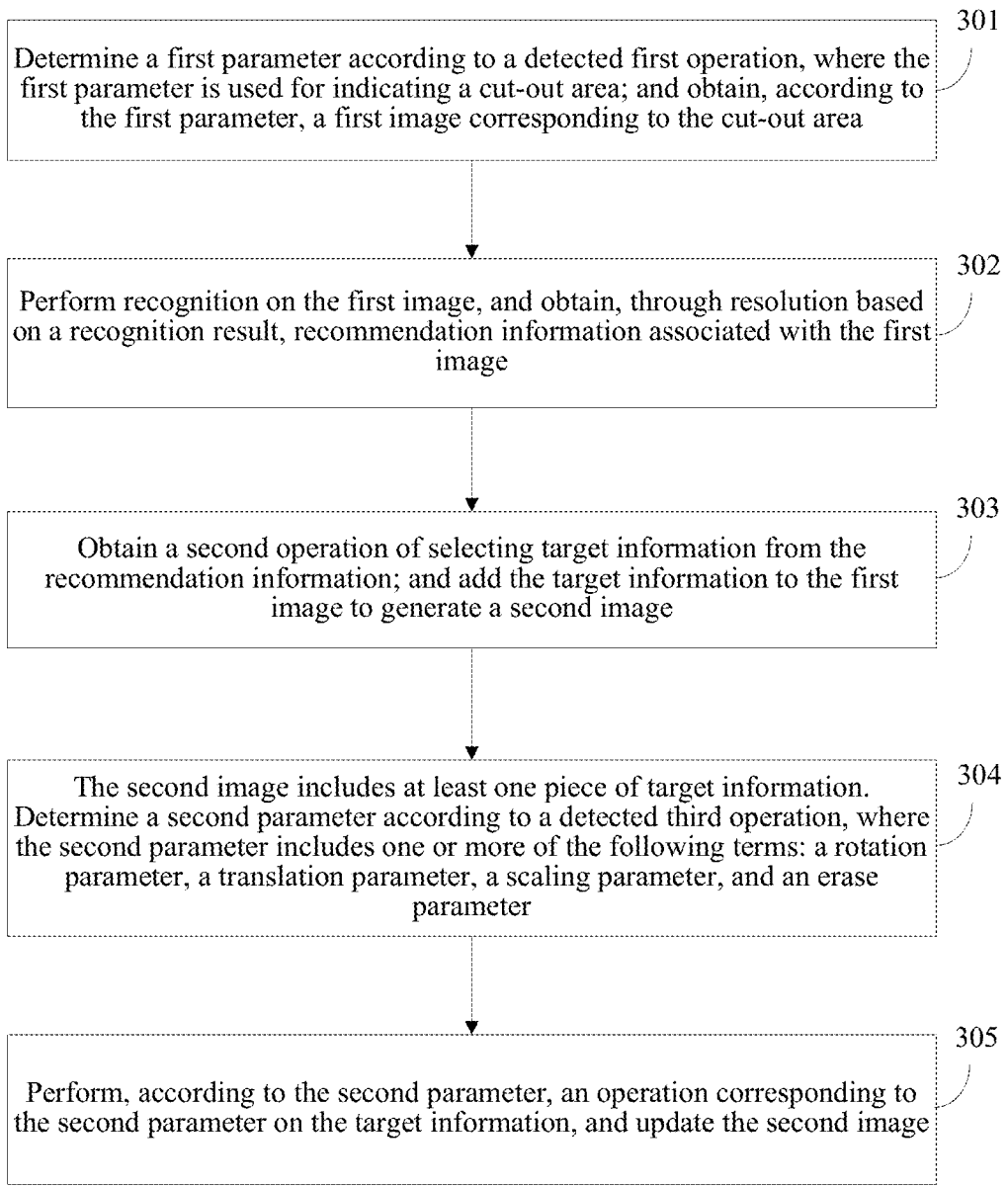
FIG. 3 is a schematic flowchart of an information processing method according to an exemplary embodiment.

FIG. 3 is a schematic flowchart of an information processing method according to an exemplary embodiment. The information processing method in this exemplary embodiment is applied to a client. As shown in FIG. 3, the information processing method includes the following steps:

Step 301. Determine a first parameter according to a detected first operation, where the first parameter is used for indicating a cut-out area; and obtain, according to the first parameter, a first image corresponding to the cut-out area.

In this exemplary embodiment, the client may be used across platforms and supports an Android operating system, an iOS, a Windows operating system, or the like.

The client has installed a first application. For example, the first application may be a news application or a video application. After the first application is enabled, target media information may be presented. Using an example in which the first application is a video application, the first application plays a target video, to present a video picture to a user. The presented video picture is not editable.

In some exemplary embodiments, the first application has a screen capture function. When the client receives an instruction for instructing to perform screen capture, the client starts to detect whether the first operation is performed on the target media information. Herein, the first operation may be specifically a screen capture operation. In this case, the user may perform a screen capture operation on an area, in which is the user interested, on the target media information. In some exemplary embodiments, a click of a mouse may be performed to locate a cursor at a first position; and then the mouse is moved to locate the cursor at a second position, and the process ends. A rectangular area that is formed by using a line between the first position and the second position as a diagonal line is the cut-out area. On such a basis, the client determines the first parameter according to the detected first operation, and the first parameter may be coordinates of the first position and coordinates of the second position. A unique cut-out area may be determined by using coordinates of two positions. Thus, the first parameter indicates the cut-out area. Alternatively, the entire target media information may be cut out. In some exemplary embodiments, cutting out of the entire target media information may be triggered by clicking a particular key (for example, a home key).

Using an example in which the target media information is an image, an image displayed on a screen is formed by pixels, and each pixel corresponds to coordinates of one position. All pixels in the cut-out area determined by the first parameter are extracted, to generate a picture, that is, to generate the first image corresponding to the cut-out area. As described above, the cut-out area may be a portion of the entire image displayed on the screen, or may be the entire image displayed on the screen. The generated picture supports a GIF, a JPEG format, a BMP format, or the like.

Step 302. Perform recognition on the first image, and obtain, through resolution based on a recognition result, recommendation information associated with the first image.

In this exemplary embodiment, the performing recognition on the first image is specifically: resolving the first image to obtain a key word related to the first image; and obtaining the recommendation information corresponding to the key word. In this way, the recommendation information may be dynamically generated according to content of the first image that is cut out. For example, if it is obtained through resolution (i.e., resolving the first image) that the content of the first image is related to a key word "fruit", a fruit-related picture is used as the recommendation information.

Step 303. Obtain a second operation of selecting target information from the recommendation information; and add the target information to the first image to generate a second image.

In this exemplary embodiment, after the screen capture is performed, the client then detects whether the second operation is performed on the first image that is cut out. Herein, the second operation is specifically an editing operation. In this exemplary embodiment, the client provides abundant editing functions in a toolbar for the user, and each editing function is embodied by using an interaction object. At least three types of editing functions are provided in the toolbar for the user. For a first type of editing function, a first type of picture information may be edited on the picture. In a second type of editing function, a second type of picture information may be edited on the picture. In a third type of editing function, text information and/or drawing information may be edited on the picture. Referring to FIG. 8, a stamping function, an emotion function, and a graffiti function are provided in the toolbar. The stamping function corresponds to the first type of picture information in this exemplary embodiment, the emotion function corresponds to the second type of picture information in this exemplary embodiment, and the graffiti function corresponds to the text information or the drawing information in this exemplary embodiment. The user may select, from the toolbar, the target information (the selection of the target information corresponds to the second operation), for example, an emotion, and then add the emotion to the picture.

In this exemplary embodiment, the target information added to the first image that is cut out may be any combination of the first type of picture information, the second type of picture information, and the third type of editing function. Thus, in the technical solution in this exemplary embodiment, a screen capture function is implemented for a non-editing application, and abundant editing is available for the first image that is cut out. Not only the first type of picture information such as a stamp but also the second type of picture information such as the emotion, and the third type of editing function such as the text information and the drawing information may be edited for the media information. In addition, in the technical solution in this exemplary embodiment, the screen capture function is implemented, and information associated with screenshot content is recommended to a user, so that accurately associated editing content is recommended.

Step 304. The second image may include at least one piece of target information. Determine a second parameter according to a detected third operation, where the second parameter includes one or more of a rotation parameter, a translation parameter, a scaling parameter, and an erase parameter.

In this exemplary embodiment, when a piece of target information of the second image is selected, the target information is set to an editable state, and target information that is not selected is set to an uneditable state. Herein, the target information in an editable state may be edited by the user in a first area, and the target information in an uneditable state is prevented from being edited by the user in the first area.

For the target information in an editable state, the target information automatically displays an editing control. Referring to FIG. 8 to FIG. 11, the user may perform a series of editing operations (the series of editing operations corresponds to the third operation) on the target information. The client detects the second parameter, and the second parameter at least includes: the rotation parameter and/or the translation parameter and/or the scaling parameter and/or the erase parameter.

Herein, the target information to be edited may alternatively be selected by the user from the first image, and the target information may be automatically set to the editable state after being selected.

Step 305. Perform, according to the second parameter, an operation corresponding to the second parameter on the target information, and update the second image.

In this exemplary embodiment, the user may perform a series of operations, such as rotation and/or translation and/or scaling and/or erase, on the target information in an editable state.

In some exemplary embodiments, the user may select the text or the stamp or the emotion already existing in the first area, the selected target information is immediately switched to the editable state and is switched to an uppermost layer, and target information that is not selected is set to the uneditable state. The text or the stamp or the emotion in an editable state may be deleted, moved, rotated, scaled, or the like.

In some exemplary embodiments, when input text (which is similar to a remark) is added by using a graffiti button, the text may be placed at a position out of a range of the picture. In this way, the user sees a more complete and clean picture.

Figure 4:
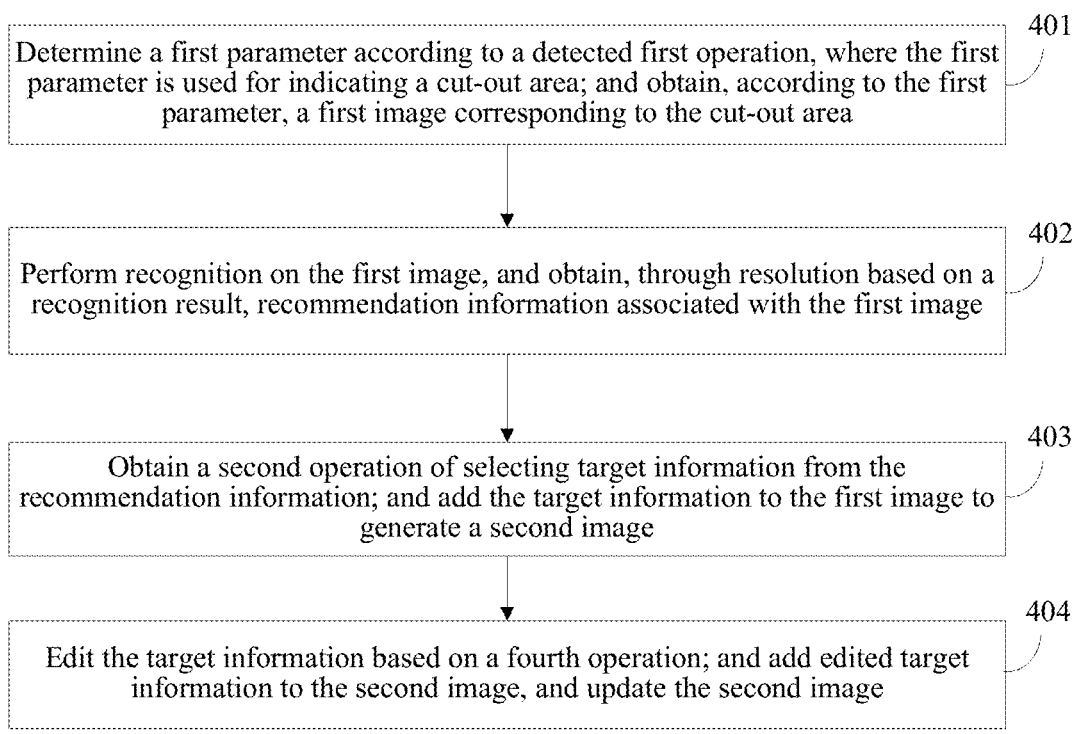
FIG. 4 is a schematic flowchart of an information processing method according to an exemplary embodiment.

FIG. 4 is a schematic flowchart of an information processing method according to an exemplary embodiment. The information processing method in this exemplary embodiment is applied to a client. As shown in FIG. 4, the information processing method includes the following steps:

Step 401. Determine a first parameter according to a detected first operation, where the first parameter is used for indicating a cut-out area; and obtain, according to the first parameter, a first image corresponding to the cut-out area.

In this exemplary embodiment, the client may be used across platforms and supports an Android operating system, an iOS, a Windows operating system, or the like.

The client has installed a first application. For example, the first application may be a news application or a video application. After the first application is enabled, target media information may be presented. Using an example in which the first application is a video application, the first application plays a target video, to present a video picture to a user. The presented video picture is not editable.

In some exemplary embodiments, the first application has a screen capture function. When the client receives an instruction for instructing to perform screen capture, the client starts to detect whether the first operation is performed on the target media information. Herein, the first operation may be specifically a screen capture operation. In this case, the user may perform a screen capture operation on an area, in which is the user interested, on the target media information. In some exemplary embodiments, a click of a mouse may be performed to locate a cursor at a first position; and then the mouse is moved to locate the cursor at a second position, and the process ends. A rectangular area that is formed by using a line between the first position and the second position as a diagonal line is the cut-out area. On such a basis, the client determines the first parameter according to the detected first operation, and the first parameter may be coordinates of the first position and coordinates of the second position. A unique cut-out area may be determined by using coordinates of two positions. Thus, the first parameter indicates the cut-out area. Alternatively, the entire target media information may be cut out. In some exemplary embodiments, cutting out of the entire target media information may be triggered by clicking a particular key (for example, a home key).

Using an example in which the target media information is an image, an image displayed on a screen is formed by pixels, and each pixel corresponds to coordinates of one position. All pixels in the cut-out area determined by the first parameter are extracted, to generate a picture, that is, to generate the first image corresponding to the cut-out area. As described above, the cut-out area may be a portion of the entire image displayed on the screen, or may be the entire image displayed on the screen. The generated picture supports a GIF, a JPEG format, a BMP format, or the like.

Step 402. Perform recognition on the first image, and obtain, through resolution based on a recognition result, recommendation information associated with the first image.

In this exemplary embodiment, the performing recognition on the first image may be specifically: resolving the first image to obtain a key word related to the first image; and obtaining the recommendation information corresponding to the key word. In this way, the recommendation information may be dynamically generated according to content of the first image that is cut out. For example, if it is obtained through resolution (i.e., resolving the first image) that the content of the first image is related to a key word "fruit", a fruit-related picture is used as the recommendation information.

Step 403. Obtain a second operation of selecting target information from the recommendation information; and add the target information to the first image to generate a second image.

In this exemplary embodiment, after the screen capture is performed, the client then detects whether the second operation is performed on the first image that is cut out. Herein, the second operation is specifically an editing operation. In this exemplary embodiment, the client provides abundant editing functions in a toolbar for the user, and each editing function is embodied by using an interaction object. At least three types of editing functions are provided in the toolbar for the user. For a first type of editing function, a first type of picture information may be edited on the picture. In a second type of editing function, a second type of picture information may be edited on the picture. In a third type of editing function, text information and/or drawing information may be edited on the picture. Referring to FIG. 8, a stamping function, an emotion function, and a graffiti function are provided in the toolbar. The stamping function corresponds to the first type of picture information in this exemplary embodiment, the emotion function corresponds to the second type of picture information in this exemplary embodiment, and the graffiti function corresponds to the text information or the drawing information in this exemplary embodiment. The user may select, from the toolbar, the target information (the selecting the target information corresponds to the second operation), for example, an emotion, and then add the emotion to the picture.

In this exemplary embodiment, the target information added to the first image that is cut out may be any combination of the first type of picture information, the second type of picture information, and the third type of editing function. Thus, in the technical solution in this exemplary embodiment, a screen capture function is implemented for a non-editing application, and abundant editing is available for the first image that is cut out. Not only the first type of picture information such as a stamp but also the second type of picture information such as the emotion, and the third type of editing function such as the text information and the drawing information may be edited for the media information. In addition, in the technical solution in this exemplary embodiment, the screen capture function is implemented, and information associated with screenshot content is recommended to a user, so that accurately associated editing content is recommended.

Step 404. Edit the target information based on a fourth operation; and add edited target information to the second image, and update the second image.

In this exemplary embodiment, not only target information recommended by the client and related to the first image may be added to the first image, but also target information may be flexibly edited by the user.

Specifically, the user selects a font setting item or a line setting item from the toolbar, and then correspondingly performs text editing or line drawing on the first image according to a selected font setting parameter or a selected line setting parameter. Specific content of the target information may be determined based on such a series of operations.

In some exemplary embodiments, the user may edit the target information based on a locally stored picture, and add the locally stored picture to the first image.

Figure 5:
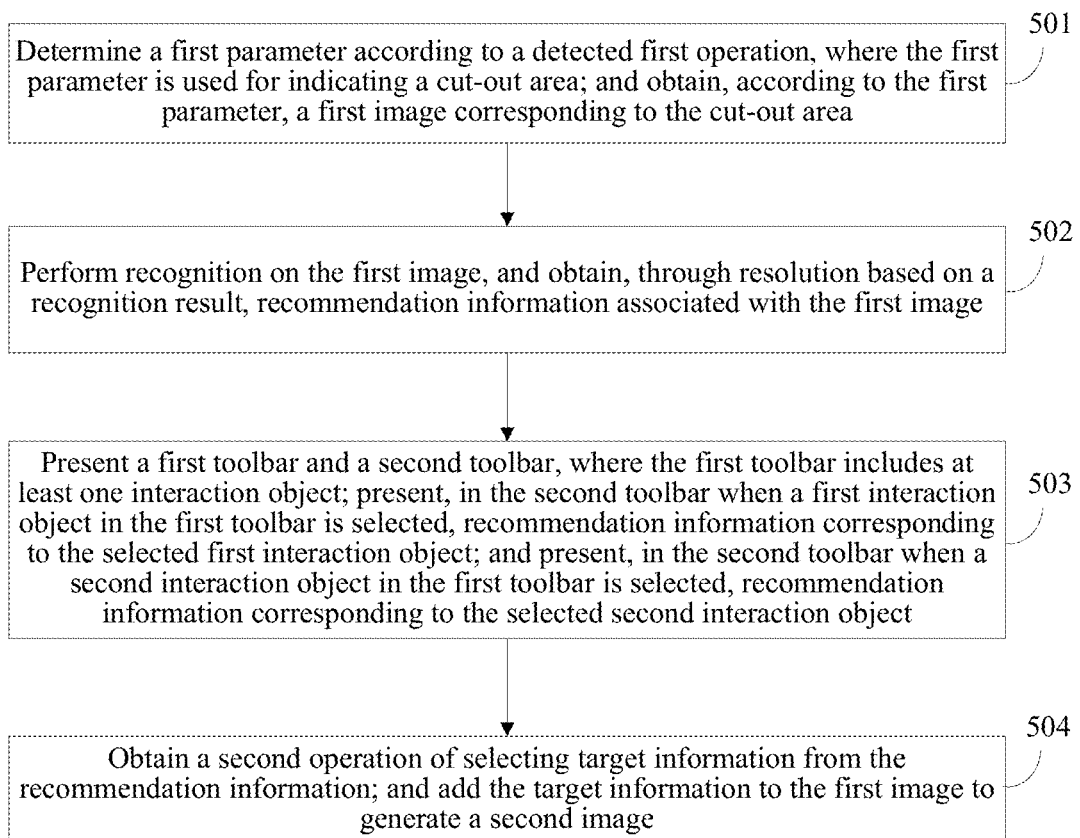
FIG. 5 is a schematic flowchart of an information processing method according to an exemplary embodiment.

FIG. 5 is a schematic flowchart of an information processing method according to an exemplary embodiment. The information processing method in this exemplary embodiment is applied to a client. As shown in FIG. 5, the information processing method includes the following steps:

Step 501. Determine a first parameter according to a detected first operation, where the first parameter is used for indicating a cut-out area; and obtain, according to the first parameter, a first image corresponding to the cut-out area.

In this exemplary embodiment, the client may be used across platforms and supports an Android operating system, an iOS, a Windows operating system, or the like.

The client has installed a first application. For example, the first application may be a news application or a video application. After the first application is enabled, target media information may be presented. Using an example in which the first application is a video application, the first application plays a target video, to present a video picture to a user. The presented video picture is not editable.

In some exemplary embodiments, the first application has a screen capture function. When the client receives an instruction for instructing to perform screen capture, the client starts to detect whether the first operation is performed on the target media information. Herein, the first operation may be specifically a screen capture operation. In this case, the user may perform a screen capture operation on an area, in which is the user interested, on the target media information. In some exemplary embodiments, a click of a mouse may be performed to locate a cursor at a first position; and then the mouse is moved to locate the cursor at a second position, and the process ends. A rectangular area that is formed by using a line between the first position and the second position as a diagonal line is the cut-out area. On such a basis, the client determines the first parameter according to the detected first operation, and the first parameter may be coordinates of the first position and coordinates of the second position. A unique cut-out area may be determined by using coordinates of two positions. Thus, the first parameter indicates the cut-out area. Alternatively, the entire target media information may be cut out. In some exemplary embodiments, cutting out of the entire target media information may be triggered by clicking a particular key (for example, a home key).

Using an example in which the target media information is an image, an image displayed on a screen is formed by pixels, and each pixel corresponds to coordinates of one position. All pixels in the cut-out area determined by the first parameter are extracted, to generate a picture, that is, the first image corresponding to the cut-out area. As described above, the cut-out area may be a portion of the entire image displayed on the screen, or may be the entire image displayed on the screen. The generated picture supports a GIF, a JPEG format, a BMP format, or the like.

Step 502. Perform recognition on the first image, and obtain, through resolution based on a recognition result, recommendation information associated with the first image.

In this exemplary embodiment, the performing recognition on the first image may be specifically: resolving the first image to obtain a key word related to the first image; and obtaining the recommendation information corresponding to the key word. In this way, the recommendation information may be dynamically generated according to content of the first image that is cut out. For example, if it is obtained through resolution (i.e., resolving the first image) that the content of the first image is related to a key word "fruit", a fruit-related picture is used as the recommendation information.

Step 503. Present a first toolbar and a second toolbar, where the first toolbar includes at least one interaction object; present, in the second toolbar when a first interaction object in the first toolbar is selected, recommendation information corresponding to the selected first interaction object; and present, in the second toolbar when a second interaction object in the first toolbar is selected, recommendation information corresponding to the selected second interaction object.

Using an example in which the first toolbar includes three interaction objects, referring to FIG. 8, the picture that is cut out is displayed in a first area. The first toolbar (i.e., a Primary toolbar in FIG. 8) and the second toolbar (i.e., a Secondary toolbar in FIG. 8) are displayed in a second area. The first toolbar includes three interaction objects, which are respectively stamp, emotion, and graffiti. However, the first toolbar is not limited to these interaction objects, and may further include additional interaction objects, for example, a contact card object or a position object. Additionally, three interaction objects are shown in FIG. 8. However, this is only an example and more or fewer than three interaction objects may be provided.

Herein, the client provides abundant editing functions in the two toolbars for the user, and each editing function is embodied by using an interaction object. A first type of picture information may be edited on the picture by using an interaction object, a second type of picture information may be edited on the picture by using an interaction object, and text information and/or drawing information may also be edited on the picture by using an interaction object. In this exemplary embodiment, interaction objects corresponding to the first type of picture information and the second type of picture information are collectively referred to as first interaction objects, and interaction objects corresponding to the text information and the drawing information are collectively referred to as second interaction objects.

The user may select the first interaction object or the second interaction object from the first toolbar. Using an example in which the user selects the first interaction object, the first interaction object is selected in this case, and recommendation information, that is, the first type of picture information or the second type of picture information, which corresponding to the first interaction object is displayed in the second toolbar, and is usually displayed according to a preset number. For example, three pieces of first type of picture information or three pieces of second type of picture information are displayed. The user may intuitively view the recommendation information provided by the first interaction object on the second toolbar, so as to conveniently select one piece of target information as target information to be added to the first image. Herein, the second toolbar further includes an extension control (for example a "more" icon). The user may view more recommendation information for subsequent selection after clicking the extension control.

When a second interaction object in the first toolbar is selected, an editing parameter setting item, that is, a font setting item and a line setting item, which corresponds to the selected second interaction object is displayed in the second toolbar. Herein, the font setting item at least includes the following information: a font size, a font type, a font format, and a font color. The line setting item includes at least a line thickness, a line color, and a line format. The user may select font setting information or line setting information from the second toolbar for text editing or line drawing.

Step 504. Obtain a second operation of selecting target information from the recommendation information; and add the target information to the first image to generate a second image.

In this exemplary embodiment, after the screen capture is performed, the client then detects whether the second operation is performed on the first image that is cut out. Herein, the second operation is specifically an editing operation. In this exemplary embodiment, the client provides abundant editing functions in a toolbar for the user, and each editing function is embodied by using an interaction object. At least three types of editing functions are provided in the toolbar for the user. For a first type of editing function, a first type of picture information may be edited on the picture. In a second type of editing function, a second type of picture information may be edited on the picture. In a third type of editing function, text information and/or drawing information may be edited on the picture. Referring to FIG. 8, a stamping function, an emotion function, and a graffiti function are provided in the toolbar. The stamping function corresponds to the first type of picture information in this exemplary embodiment, the emotion function corresponds to the second type of picture information in this exemplary embodiment, and the graffiti function corresponds to the third type of editing function in this exemplary embodiment. The user may select, from the toolbar, the target information (the selected target information corresponds to the second operation), for example, an emotion, and then add the emotion to the picture.

Specifically, after the user clicks the first interaction object in the first toolbar, a plurality of pieces of first type of picture information or a plurality of pieces of second type of picture information corresponding to the first interaction object are displayed on the second toolbar. The user selects picture information from the second toolbar as information to be added to the first image. Specific content of the target information may be determined based on such a series of operations.

After the user clicks the second interaction object in the first toolbar, the font setting item and the line setting item are displayed in the second toolbar. The user selects a font setting item or a needed line setting item from the second toolbar, and then correspondingly performs text editing or line drawing on the first image according to a selected font setting parameter or a selected line setting parameter. Specific content of the target information may be determined based on such a series of operations.

Figure 9:
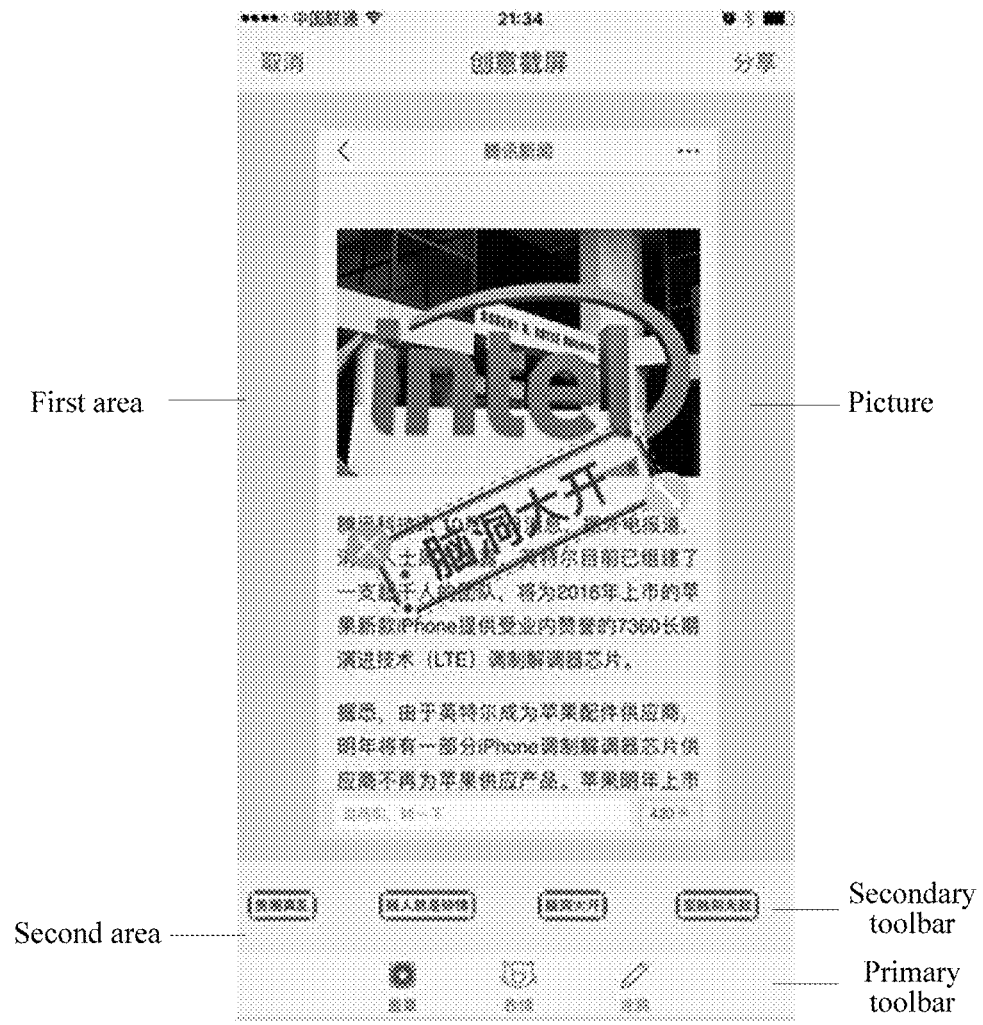
FIG. 9 is a schematic diagram 2 of a screenshot interface scenario according to an exemplary embodiment.

Referring to FIG. 9, after the user clicks a stamp button, recently used and customized stamps are dynamically updated to appear in the second toolbar (i.e., the Secondary toolbar in FIG. 9), as shown by four stamps in the figure. After the user clicks a third stamp in the second toolbar, the stamp is added to a picture of the first area.

Figure 10:
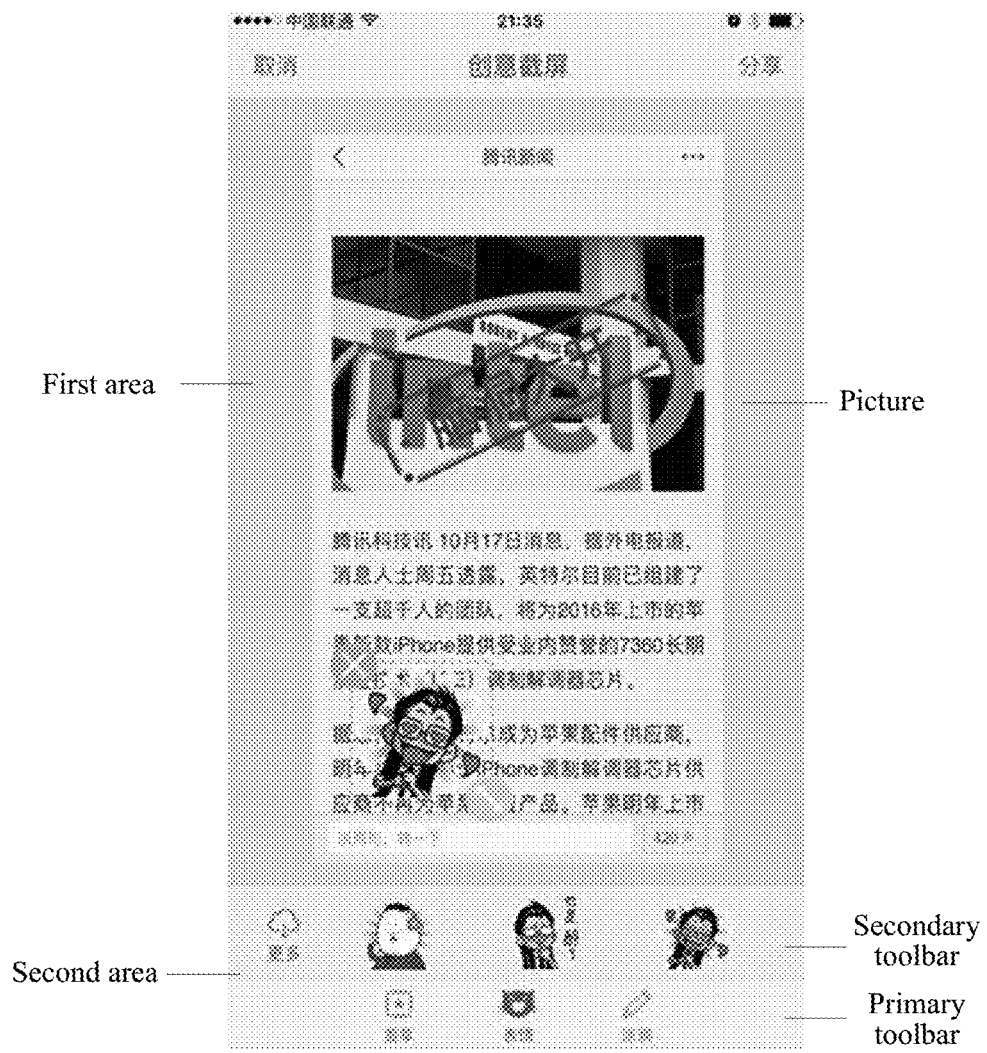
FIG. 10 is a schematic diagram 3 of a screenshot interface scenario according to an exemplary embodiment.

Referring to FIG. 10, after the user clicks an emotion button, recently used and customized emotions are dynamically updated to appear in the second toolbar (i.e., the Secondary toolbar in FIG. 10). As shown by three emotions in the figure, after the user clicks a third emotion in the second toolbar, the emotion is added to a picture of the first area.

Figure 11:
FIG. 11 is a schematic diagram 4 of a screenshot interface scenario according to an exemplary embodiment.

Referring to FIG. 11, after the user clicks a graffiti button, a font setting bar and a line setting bar are dynamically updated to appear in the second toolbar (i.e., the Secondary toolbar). After setting line setting information in the line setting bar, the user may add graffiti to a picture of the first area. After setting font setting information in the font setting bar, the user may edit text on the picture of the first area.

In this exemplary embodiment, the target information added to the first image that is cut out may be any combination of the first type of picture information, the second type of picture information, and the third type of picture information such as the text information and the drawing information. Thus, in the technical solution in this exemplary embodiment, a screen capture function is implemented for a non-editing application, and abundant editing is available for the first image that is cut out. Not only the first type of picture information such as a stamp but also the second type of picture information such as the emotion, and the third type of picture information such as the text information and the drawing information may be edited for the media information. In addition, in the technical solution in this exemplary embodiment, the screen capture function is implemented, and information associated with screenshot content is recommended to a user, so that accurately associated editing content is recommended.

Application Scenario 1

Referring to FIG. 9, the first toolbar (i.e., the Primary toolbar in FIG. 9) includes three interaction objects, which are respectively a stamp interaction object, an emotion interaction object, and a graffiti interaction object. Each interaction object is presented by using a respective icon. To help the user intuitively understand a function of an interaction object, an interaction object icon is generally set to a function-related picture or key word. Referring to FIG. 9, after the user clicks a stamp button, recently used and customized stamps are dynamically updated to appear in the second toolbar (i.e., the Secondary toolbar in FIG. 9), as shown by four stamps in the figure. In this case, the user may select one of the four stamps as the target information. For example, after the user clicks a third stamp in the second toolbar, the stamp is added to the picture of the first area.

Application Scenario 2

Referring to FIG. 10, the first toolbar (i.e., the Primary toolbar in FIG. 10) includes three interaction objects, which are respectively a stamp interaction object, an emotion interaction object, and a graffiti interaction object. Each interaction object is presented by using a respective icon. To help the user intuitively understand a function of an interaction object, an interaction object icon is generally set to a function-related picture or key word. Referring to FIG. 9, after the user clicks an emotion button, recently used and customized emotions are dynamically updated to appear in the second toolbar (i.e., the Secondary toolbar in FIG. 10), as shown by three emotions in the figure. In this case, the user may select one of the three emotions as the target information. For example, after the user clicks a third emotion in the second toolbar, the emotion is added to the picture of the first area.

Application Scenario 3

Referring to FIG. 11, the first toolbar (i.e., the Primary toolbar in FIG. 11) includes three interaction objects, which are respectively a stamp interaction object, an emotion interaction object, and a graffiti interaction object. Each interaction object is presented by using a respective icon. To help the user intuitively understand a function of an interaction object, an interaction object icon is generally set to a function-related picture or key word. Referring to FIG. 11, after the user clicks a graffiti button, a font setting item and a line setting item are dynamically updated to appear in the second toolbar (i.e., the Secondary toolbar in FIG. 11). After setting a line setting parameter in the line setting item, the user may add graffiti to the picture of the first area. After setting a font setting parameter in the font setting item, the user may edit text on the picture of the first area.

Figure 6:
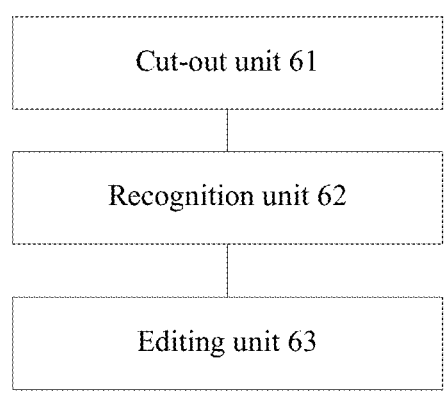
FIG. 6 is a schematic structural composition diagram of a client according to an exemplary embodiment.

Returning to FIG. 6, FIG. 6 is a schematic structural composition diagram of a client according to an exemplary embodiment. As shown in FIG. 6, the client includes: a cut-out unit 61, configured to: determine a first parameter according to a detected first operation, the first parameter being used for indicating a cut-out area; and obtain, according to the first parameter, a first image corresponding to the cut-out area; a recognition unit 62, configured to: perform recognition on the first image, and obtain, through resolution based on a recognition result, recommendation information associated with the first image; and an editing unit 63, configured to: obtain a second operation of selecting target information from the recommendation information; and add the target information to the first image to generate a second image.

It should be understood by a person skilled in the art that, for implementation of functions of the units of the client shown in FIG. 6, refer to the related descriptions in the foregoing information processing method for understanding. The functions of the units of the client shown in FIG. 6 may be implemented by using a program including computer program code running on a processor, or may be implemented by using a specific logical circuit.

Figure 7:
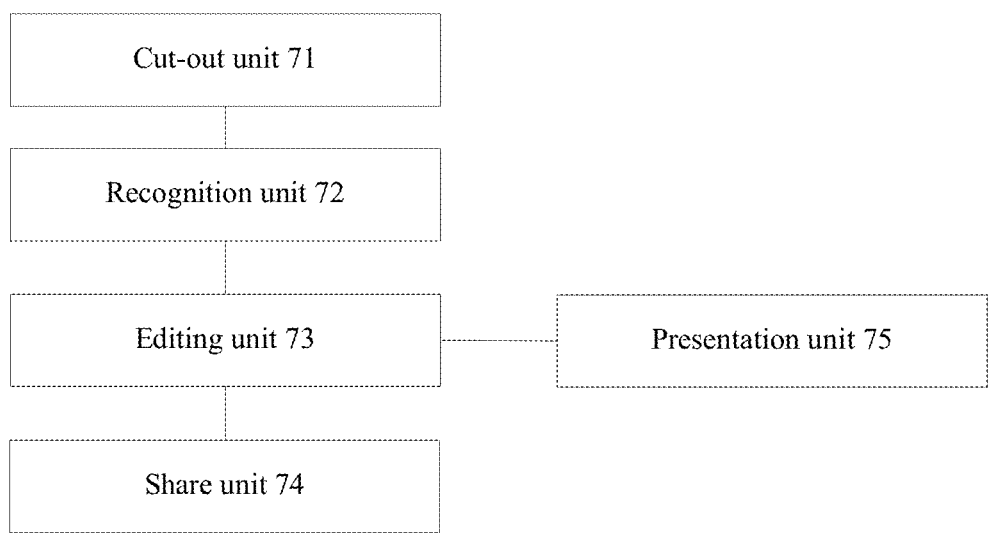
FIG. 7 is a schematic structural composition diagram of a client according to an exemplary embodiment.

FIG. 7 is a schematic structural composition diagram of a client according to an exemplary embodiment. As shown in FIG. 7, the client includes: a cut-out unit 71, configured to: determine a first parameter according to a detected first operation, the first parameter being used for indicating a cut-out area; and obtain, according to the first parameter, a first image corresponding to the cut-out area; a recognition unit 72, configured to: perform recognition on the first image, and obtain, through resolution based on a recognition result, recommendation information associated with the first image; and an editing unit 73, configured to: obtain a second operation of selecting target information from the recommendation information; and add the target information to the first image to generate a second image.

The client further includes: a share unit 74, configured to: select, based on an interaction factor indicating interaction between contacts and the first image, a target contact from the contacts as a sending object after the second image is generated; and send the second image to the sending object.

The second image includes at least one piece of target information.

The editing unit 73 is further configured to: determine a second parameter according to a detected third operation, where the second parameter includes one or more of the following terms: a rotation parameter, a translation parameter, a scaling parameter, and an erase parameter; and perform, according to the second parameter, an operation corresponding to the second parameter on the target information, and update the second image.

The editing unit 73 is further configured to: edit the target information based on a fourth operation; and add edited target information to the second image, and update the second image.

The client further includes: a presentation unit 75, configured to: present a first toolbar and a second toolbar, where the first toolbar includes at least one interaction object; present, in the second toolbar when a first interaction object in the first toolbar is selected, recommendation information corresponding to the selected first interaction object; and present, in the second toolbar when a second interaction object in the first toolbar is selected, recommendation information corresponding to the selected second interaction object.

It should be understood by a person skilled in the art that, for implementation of functions of the units of the client shown in FIG. 7, refer to the related descriptions in the foregoing information processing method for understanding. The functions of the units of the client shown in FIG. 7 may be implemented by using a program including computer program code running on a processor, or may be implemented by using a specific logical circuit.

The technical solutions according to the exemplary embodiments may be randomly combined with each other provided that there is no conflict.

In the exemplary embodiments discussed herein, it should be understood that the disclosed method and intelligent device may be implemented in other manners. The described device embodiments are merely exemplary. For example, the unit division is merely a logical function division and may be another division during actual implementation. For example, multiple units or components may be combined or integrated into another system, or some features may be ignored or not performed. In addition, the displayed or discussed mutual couplings or direct couplings or communication connections between the components may be implemented through some interfaces, indirect couplings or communication connections between the devices or units, or electrical connections, mechanical connections, or connections in other forms.

The units described as separate parts may be or may not be physically separated. The part used as display unit may be or may not be a physical unit. That is, the units may be located in a same place, or may be distributed to many network units. Some or all of the units may be selected according to actual implementations to implement the purpose of the solution of the exemplary embodiments.

In addition, functional units in the exemplary embodiments may be all integrated in a second processing unit, each unit is separately used as a unit, or two or more units are integrated in a unit. The integrated unit may be implemented in a form of hardware, or may be implemented in form of hardware plus a software functional unit.

In the technical solutions provided in the exemplary embodiments, the first parameter is determined according to the detected first operation, and the first parameter is used for indicating the cut-out area. The first image corresponding to the cut-out area is obtained according to the first parameter. Recognition is performed on the first image, and the recommendation information associated with the first image is obtained through resolution (i.e., resolving) based on the recognition result. The second operation of selecting the target information from the recommendation information is performed. The target information is added to the first image to generate the second image. Thus, by the technical solutions in the exemplary embodiments, a screen capture function is implemented, and a screenshot editing function is also implemented. In addition, information associated with screenshot content is recommended to a user, so that accurately associated editing content is recommended.

The foregoing descriptions are merely specific implementations of the present disclosure, but are not intended to limit the protection scope of the present disclosure. Any variation or replacement readily figured out by a person skilled in the art within the technical scope disclosed in the present disclosure shall fall within the protection scope of the present disclosure.

What is claimed is:
1. A method comprising:
  determining a first parameter according to a detected first operation, the first parameter being used for indicating a cut-out area;
  obtaining, according to the first parameter, a first image corresponding to the cut-out area;
  performing recognition on the first image, and obtaining, based on a recognition result, recommendation information associated with the first image, the recommendation information comprising one or more types of editing functions;
  presenting the recommendation information in a first toolbar;
  receiving a selection of one type of the one or more types of editing functions;

in response to the selection, displaying, in a second toolbar, target information corresponding to the one type that is selected;

detecting a second operation of selecting target information from the displayed target information; and adding the selected target information to the first image to generate a second image.

2. The method according to claim 1, further comprising:

in response to the second image being generated, selecting, based on an interaction factor indicating interaction between the first image and a plurality of contacts, a target contact from among the plurality of contacts as a sending object; and sending the second image to the sending object.

3. The method according to claim 1, wherein the second image comprises of the selected target information; and the method further comprises:

detecting a third operation;

determining a second parameter according to the detected third operation, wherein the second parameter comprises one or more of a rotation parameter, a translation parameter, a scaling parameter, and an erase parameter; and performing, according to the second parameter, an operation that corresponds to the second parameter on the selected target information, and updating the second image.

4. The method according to claim 1, further comprising:

detecting a fourth operation;

editing the selected target information based on the fourth operation; and adding edited target information to the second image, and updating the second image.

5. A method comprising:

determining a first parameter according to a detected first operation, the first parameter being used for indicating a cut-out area;

obtaining, according to the first parameter, a first image corresponding to the cut-out area;

performing recognition on the first image, and obtaining, based on a recognition result, recommendation information associated with the first image;

detecting a second operation of selecting target information from the recommendation information; and adding the selected target information to the first image to generate a second image, further comprising:

presenting a first toolbar and a second toolbar, wherein the first toolbar comprises at least one interaction object;

presenting, in the second toolbar in response to a selection of a first interaction object in the first toolbar, recommendation information corresponding to the selected first interaction object; and presenting, in the second toolbar in response to a selection of a second interaction object in the first toolbar, recommendation information corresponding to the selected second interaction object.

6. A client comprising:

at least one memory configured to store computer program code; and at least one processor configured to access the at least one memory and operate according to the computer program code, the program code including:

cut-out code configured to cause at least one of the at least one processor to:

determine a first parameter according to a detected first operation, the first parameter for indicating a cut-out area; and obtain, according to the first parameter, a first image corresponding to the cut-out area;

recognition code configured to cause at least one of the at least one processor to:

perform recognition on the first image, and obtain, based on a recognition result, recommendation information associated with the first image, the recommendation information comprising one or more types of editing functions; and presentation code causing at least one of the at least one processor to:

present the recommendation information in a first toolbar;

receiving code causing at least one of the at least one processor to receive a selection of one type of the one or more types of editing functions;

displaying code causing at least one of the at least one processor to, in response to the selection, display, in a second toolbar, target information corresponding to the one type that is selected;

editing code configured to cause at least one of the at least one processor to:

obtain a second operation of selecting target information from the displayed target information; and add the selected target information to the first image to generate a second image.

7. The client according to claim 6, wherein the program further comprises:

share code configured to cause at least one of the at least one processor to:

in response to the second image being generated, select, based on an interaction factor indicating interaction between the first image and a plurality of contacts, a target contact from among the plurality of contacts as a sending object; and send the second image to the sending object.

8. The client according to claim 6, wherein the second image comprises the selected target information; and the editing code further causes at least one of the at least one processor to determine a second parameter according to a detected third operation, wherein the second parameter comprises one or more of a rotation parameter, a translation parameter, a scaling parameter, and an erase parameter; and wherein the editing code further causes at least one of the at least one processor to:

perform, according to the second parameter, an operation corresponding to the second parameter on the selected target information, and update the second image.

9. The client according to claim 6, wherein the editing code further causes at least one of the at least one processor to:

edit the selected target information based on a fourth operation; and add the edited target information to the second image, and update the second image.

10. A client comprising:

at least one memory configured to store computer program code; and at least one processor configured to access the at least one memory and operate according to the computer program code, the program code including:

cut-out code configured to cause at least one of the at least one processor to:
   determine a first parameter according to a detected first operation, the first parameter for indicating a cut-out area; and
   obtain, according to the first parameter, a first image corresponding to the cut-out area;
recognition code configured to cause at least one of the at least one processor to:
   perform recognition on the first image, and
   obtain, based on a recognition result, recommendation information associated with the first image; and
editing code configured to cause at least one of the at least one processor to:
   obtain a second operation of selecting target information from the recommendation information; and
   add the selected target information to the first image to generate a second image,
wherein the presentation code further causes the at least one of the at least one processor to:
   present a first toolbar and a second toolbar, wherein the first toolbar comprises at least one interaction object;
   present, in the second toolbar when a first interaction object in the first toolbar is selected, recommendation information corresponding to the selected first interaction object; and
   present, in the second toolbar when a second interaction object in the first toolbar is selected, recommendation information corresponding to the selected second interaction object.

11. A method comprising:
performing a screen capture of a displayed picture to generate a first image;
analyzing the first image to obtain recommendation information associated with the first image, the recommendation information comprising one or more types of editing functions;
displaying the recommendation information in a first toolbar;
receiving a selection of one type of the one or more types of editing functions and, in response to the selection, displaying, in a second toolbar, target information corresponding to the one type that is selected;
detecting a selection of the target information; and
adding the selected target information to the first image to generate a second image.

12. The method of claim 11, wherein the screen capture captures a portion of the displayed picture as the first image.

13. The method of claim 12, wherein the portion of the display picture is indicated by a cut-out area set by a user.

14. The method of claim 11, wherein the screen capture captures an entire displayed picture as the first image.

15. The method of claim 11, wherein the analyzing comprises:
performing recognition on the first image to obtain the content of the first image;
generating a keyword related to the content of the first image; and
obtaining recommendation information corresponding to the keyword.

16. The method of claim 15, wherein:
the recommendation information is an emotion editing function, and the target information is an emotion selected from a plurality of emotions,
the recommendation information is a stamping editing function, and the target information is a stamp selected from a plurality of stamps, or
the recommendation information is a graffiti editing function, and the target information is text or drawing input by the user.

17. The method of claim 11, wherein the one or more types of editing functions comprises a stamping function, an emotion function and a graffiti function.

18. The method of claim 11, wherein:
the recommendation information is an emotion editing function, and the target information is an emotion selected from a plurality of emotions,
the recommendation information is a stamping editing function, and the target information is a stamp selected from a plurality of stamps, or
the recommendation information is a graffiti editing function, and the target information is text or drawing input by the user.

* * * * *